(12) United States Patent
Hopper

(10) Patent No.: US 6,361,287 B1
(45) Date of Patent: Mar. 26, 2002

(54) FLUID PUMPING SYSTEM FOR AUTOMATIC TRANSMISSION

(75) Inventor: Mark L. Hopper, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/668,985

(22) Filed: Sep. 25, 2000

(51) Int. Cl.⁷ ................................ F04B 49/00
(52) U.S. Cl. ........................................ 417/286
(58) Field of Search ................... 416/286, 428

(56) References Cited

U.S. PATENT DOCUMENTS

| | | | |
|---|---|---|---|
| 3,780,841 A | * 12/1973 | Wells | 192/61 |
| 4,204,811 A | 5/1980 | Carter et al. | |
| 4,502,845 A | 3/1985 | Chana | |
| 5,087,177 A | 2/1992 | Haley et al. | |
| 5,357,929 A | * 10/1994 | McCandless | 123/446 |
| 5,513,732 A | 5/1996 | Goates | |
| 6,044,645 A | * 4/2000 | Greenan et al. | 60/337 |
| 6,267,160 B1 | * 7/2001 | Viken | 14/98 |

* cited by examiner

*Primary Examiner*—Teresa Walberg
*Assistant Examiner*—Vinod D. Patel
(74) *Attorney, Agent, or Firm*—Laura C. Hargitt; Leslie C. Hodges

(57) ABSTRACT

A fluid pumping system for an automatic transmission includes a primary pump operable to draw fluid from a sump to a main delivery line to a main hydraulic circuit of the transmission. A main circuit pressure regulator regulates pressure to the main circuit and exhausts excess fluid to a secondary delivery line to a secondary hydraulic circuit of the transmission. A secondary pump operates to draw fluid from the suction line to a discharge line. A check ball valve operates to permit one way flow from the discharge line to the secondary delivery line. A secondary circuit pressure regulator regulates pressure to the secondary circuit and operates to exhaust flow from the discharge line to a return line or from the discharge line and the secondary delivery line wherein the return line is in continuous fluid communication with the suction line to reduce hydraulic horsepower expended by the secondary pump.

6 Claims, 1 Drawing Sheet

FLUID PUMPING SYSTEM FOR AUTOMATIC TRANSMISSION

TECHNICAL FIELD

The present invention relates to a fluid pumping system for an automatic transmission.

BACKGROUND OF THE INVENTION

A power transmission has a fluid pumping system, driven by an engine to deliver fluid to a transmission hydraulic system. The hydraulic system distributes pressurized oil for such transmission operations as shifting gears, torque conversion, lubrication, and cooling. During vehicle acceleration from a low engine speed, relatively high pressure is needed to quickly transfer torque through the gears. Therefore the pump of the fluid pumping system draws substantial energy from the engine. The single pump must be sized to accommodate such maximum flow and pressure requirements of the transmission. This also means that the pump produces excess capacity during lower flow demand operating conditions such as when the vehicle is cruising at higher engine speed. The excess fluid is exhausted through a regulator valve and is therefore a power loss in the system. One proposed solution to improve efficiency is to include a second pump in the pumping system, operating to supplement a lower capacity main pump only during maximum flow demand.

The transmission hydraulic circuit to which the fluid pumping system supplies pressurized fluid may include both a low pressure circuit and a separate high pressure circuit each having individual pressure and flow requirements. The low pressure circuit may deliver lubrication throughout the transmission, whereas the high pressure circuit may deliver high pressure fluid to quickly activate friction devices such as clutches and bands in the gearing mechanism. Since the pump scavenges energy directly from the engine, it is desireable to reduce the pump energy draw when not needed to meet the requirements of the automatic transmission thereby reducing fuel consumption.

SUMMARY OF THE INVENTION

The present invention is for a fluid pumping system for an automatic transmission, and particularly to support two independent hydraulic circuits within the transmission hydraulic system. The pressure delivered to each of the independent hydraulic circuits is individually regulated to that particular circuit's requirements. The fluid pumping system provides this functionality while improving fuel efficiency.

The primary pump is in continuous flow communication with the main hydraulic circuit and selectively connected to the secondary circuit through a main circuit regulator. The secondary pump is connected to the secondary circuit via a one-way check ball valve. A secondary circuit regulator regulates pressure delivered to the secondary circuit.

As excess pump flow is developed from the primary pump during certain operating conditions, the main circuit regulator may open to route excess primary pump flow directly to the secondary hydraulic circuit. If the flow provided by the primary pump is sufficient to meet the demands of the secondary circuit, then the secondary circuit regulator shifts to re-circulate flow from the secondary pump back to the sump and not to the secondary circuit. Here the secondary pump essentially freewheels as it operates against zero pressure, substantially reducing the horsepower draw, when the engine is operating at high speeds sufficient for the primary pump to meet the flow demands of both circuits or when there is low flow requirements. This mode of operation improves vehicle fuel economy. Further, if the primary pump is delivering more flow than is needed by the secondary circuit, the excess flow from the primary pump may be diverted by the secondary circuit regulator back to the sump.

BRIEF DESCRIPTION OF THE DRAWINGS

The FIGURE is a schematic of a fluid pumping system for use in an automatic transmission.

DESCRIPTION OF THE PREFERRED EMBODIMENT

Figure 1:
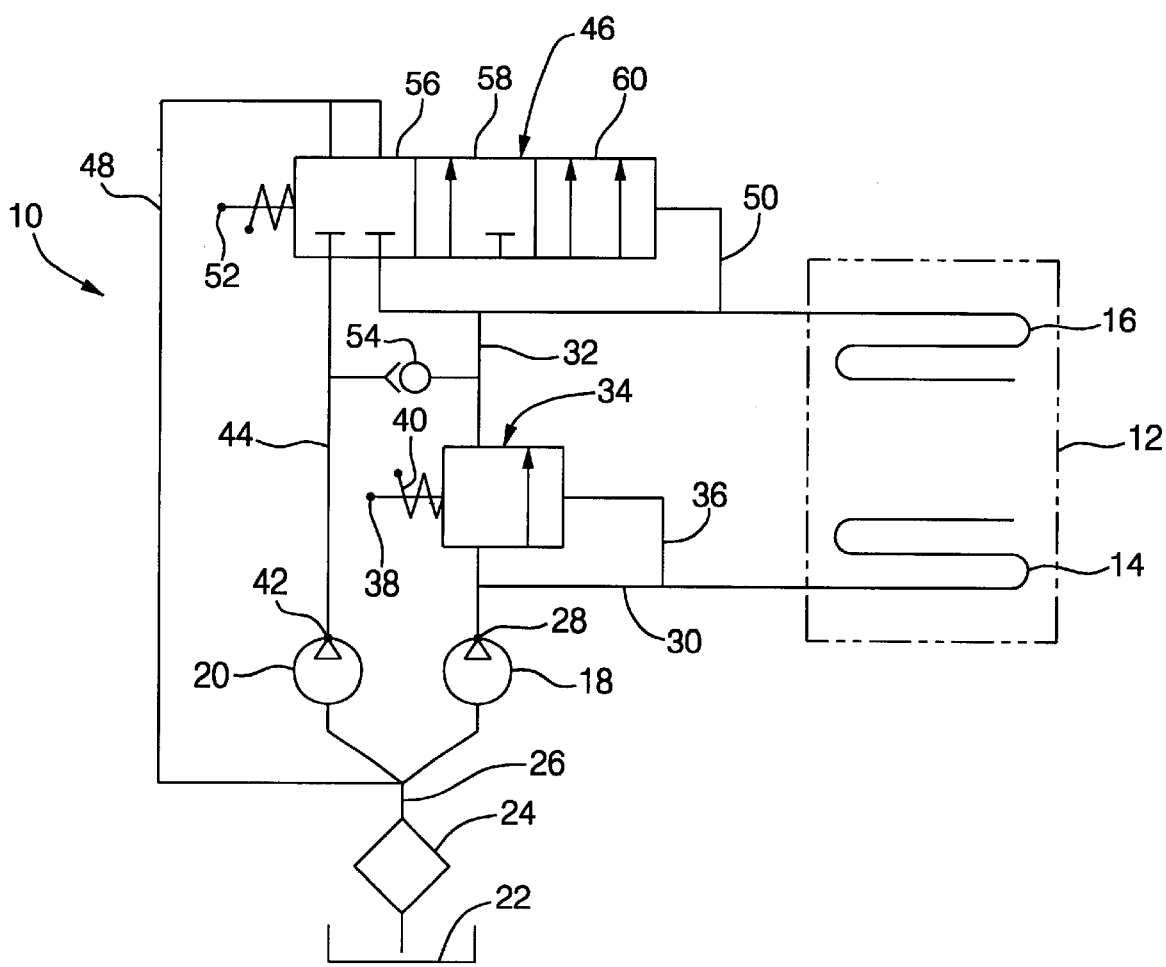

Referring to the FIGURE, there is shown a fluid pumping system, generally designated as 10, to supply fluid to a hydraulic valve body 12 of an automatic transmission. The hydraulic valve body 12 includes two circuits: a high pressure, main circuit 14 and a low pressure, secondary circuit 16, each of which is delivered fluid from the fluid pumping system 10 individually. The secondary circuit 16 may deliver low pressure fluid for such functions as lubricating the automatic transmission, operating a torque converter valve solenoids, or cooling. The main circuit 14 delivers high pressure fluid to the gearing mechanisms of the transmission such as fluid-operated clutches and brakes or continuously variable units.

The fluid pumping system 10 includes a primary pump 18 and a secondary pump 20. A common sump 22 and filter 24 are in continuous fluid communication with inlets to each pump 18,20 by a suction line 26. Pressurized fluid flows out a primary pump outlet 28 to a high pressure, main delivery line 30, which is in continuous fluid communication with the main circuit 14 of the transmission valve body 12 for delivering high pressure fluid thereto. The primary pump outlet 28 is also in selective fluid communication with a secondary delivery line 32 to deliver low pressure fluid to the secondary circuit 16 of the transmission valve body 12. A two-position, main circuit pressure regulator 34 is disposed intermediate the primary pump outlet 28 and the secondary delivery line 32 and includes a feedback line 36 from the main delivery line 30 on one side of the pressure regulator 34 and a main circuit pressure signal 38 on the opposing side (left side in the FIGURE). A spring 40 biases the main circuit regulator valve 34 to the right, as shown, to prevent flow from the primary pump outlet 28 to the secondary delivery line 32. The main circuit regulator 34 is connected to regulate pump discharge to the main line 30 by exhausting fluid therefrom to the secondary delivery line 32 in response to main line pressure above the main circuit pressure signal 38. When the main delivery pressure is greater than the main circuit pressure signal 38, the two-position main circuit pressure regulator 34 shifts to the left, compressing the spring 40, and opening the flow path from the primary pump outlet 28 to the secondary delivery line 32.

A secondary pump outlet 42 of the secondary pump 20 is in continuous fluid communication with a discharge line 44 which extends to a three-position, secondary circuit pressure regulator 46. The secondary circuit regulator 46 includes two inputs—the discharge line 44 and the secondary delivery line 32—and effectively one output to a common return line 48 to the suction line 26. A secondary feedback line 50 connects the secondary delivery line 32 to one side of the secondary circuit regulator 46. A secondary circuit signal 52 provides a signal pressure on the opposing side, shown on the left in the FIGURE. The secondary circuit regulator 46 operates to balance the pressures in the secondary delivery line 32 to the secondary circuit pressure signal 52.

Upstream of the secondary circuit regulator 46, the discharge line 44 is connected to the secondary delivery line 32 via a check ball valve 54. A pressure differential across the check ball valve 54 operates to move the valve, allowing flow from the discharge line 44 to the secondary delivery line 32, while not allowing flow from the secondary delivery line to the discharge line.

The secondary circuit regulator 46 has three regulating positions of operation. The first position, shown in the FIGURE as 56, does not exhaust flow through the regulator 46 to the return line 48 as the fluid pressure in the secondary delivery line 32 is less than the secondary circuit signal 52. A pressure differential operates to move the check ball valve 54, allowing flow from the secondary pump 20 to be directed to the secondary delivery line 32. If there is flow in the secondary delivery line 32 from the primary pump 18, it is added to the flow from the secondary pump 20.

In the second position 58, shown as the center position in the FIGURE, all or a portion of the flow from the secondary pump 20, through the discharge line 44 is allowed to flow through the secondary circuit regulator 46 and to the return line 48. Some of the secondary pump flow may also flow through the check ball valve 54 to the secondary delivery line 32. In this instance, fluid is re-circulated to the suction line 26 relieving the secondary pump 20 of a portion of the hydraulic work of drawing fluid from the sump 22. In the second position 58, any fluid in the secondary delivery line 32 from the primary pump 18 is not exhausted through the secondary circuit regulator 46, but may flow to the secondary circuit 16.

In the third position 60, shown as the right position in the FIGURE, continued pressure buildup in the secondary delivery line 32 as compared to the secondary circuit signal 52 necessitates more exhausting through the secondary circuit regulator 46. A portion of the flow from the primary pump 18 through the secondary delivery line 32 and all the flow from the secondary pump 20 through the discharge line 44 are exhausted through the secondary circuit regulator 46 to the return line 48. The third position 60 is utilized when limited fluid flow is needed by the secondary circuit 16 and the need is met by the primary pump 18.

Having described the basic operations of the main and secondary circuit pressure regulators 34,46, their role may be better understood by a discussion of their typical operation in serving the transmission valve body 12.

For example, the secondary circuit 16 may receive fluid flow in three alternative ways. First, the primary pump 18 may solely deliver fluid if excess fluid is being diverted through the main circuit regulator 34 to the secondary delivery line 32 because the main delivery line pressure is greater than required by the main circuit 14. In this case the secondary circuit regulator 46 may be in the second or third position 58,60. Second, the secondary pump 20 may solely deliver fluid if the main circuit regulator 34 is closed to direct all flow from the primary pump 18 to the main circuit 14. In this case the secondary circuit regulator 46 may be in the first or second position 56,58. If the secondary circuit 16 requires higher flows than either pump can deliver individually, then both pumps 18,20 may deliver fluid thereto, assuming the primary pump 18 is producing pressure in excess of the main circuit signal 38. In this instance, the secondary circuit regulator 46 may be in the first or second position 56,58.

As relative pump capacity is increased by either engine input speed displacing more fluid or decreased flow requirements to the secondary circuit 20, then excess fluid may be re-circulated to the suction line 26 at the pump inlets. All of the flow from the secondary pump 20 to the discharge line 44 may be re-circulated if the primary pump 18 is sufficient to meet the demands of the main and secondary circuits 14,16. Or a portion of the flow from the secondary pump 20 to the secondary delivery line 32 may be exhausted and re-circulated to the suction line 26. Finally, a portion of the flow from the primary pump 18 to the secondary delivery line 32 may be exhausted and re-circulated to the suction line 26 if the primary pump is supplying greater pressure to the secondary delivery line than the secondary circuit signal 52 indicates is needed.

The present invention is for a fluid pumping system 10, which supplies fluid to two distinct hydraulic circuits 14,16, regulatable at different pressures and flows. The primary pump 18 is a higher pressure pump which supplies regulated flow to a main hydraulic circuit 14. The secondary pump 20 is a lower pressure pump which may supply a portion or all of the flow needed to support the secondary hydraulic circuit 16. Excess flow developed by the primary pump 18 may be exhausted to the secondary circuit 16 to supplement or supplant the function of the secondary pump 20. In such a case, the secondary circuit pressure regulator 46 re-circulates excess flow from the secondary pump 20 to the pump suction line 26. Therefore the fluid pumping system provides flexibility to the transmission hydraulic system by having two regulatable outputs while reducing pumping losses without sacrificing volumetric efficiency in meeting a broad range of flow requirements in two different output hydraulic circuits.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A fluid pumping system for an automatic transmission, comprising:

a primary pump operable to draw fluid from a sump through a suction line to a primary pump outlet, a main delivery line in continuous fluid communication extending from said primary pump outlet to a main hydraulic circuit of the transmission, a main circuit pressure regulator to regulate pressure in said main delivery line to said main circuit, a secondary delivery line to which said main circuit pressure regulator exhausts excess fluid from said main delivery line to a secondary hydraulic circuit of the transmission, a secondary pump operable to draw fluid from said suction line to a secondary pump outlet, a discharge line in continuous fluid communication with said secondary pump outlet, a check ball valve disposed intermediate said discharge line and said secondary delivery line operable to permit flow from said discharge line to said secondary delivery line, and a secondary circuit pressure regulator to regulate pressure in said secondary delivery line to said secondary circuit and operable to exhaust flow to a return line in fluid communication with said suction line and wherein excess flow exhausted through said secondary circuit pressure regulator reduces hydraulic horse power expended by said secondary pump.

2. A fluid pumping system, as defined in claim 1, further comprising a feedback line from said main delivery line to one side of said main circuit pressure regulator and a main circuit pressure signal on an opposing side of said main circuit pressure regulator, wherein said main circuit pressure regulator is biased so as to not exhaust primary pump flow to said secondary circuit unless pressure in said feedback line is greater than said main circuit pressure signal.

3. A fluid pumping system, as defined in claim 2, further comprising a secondary feedback line from said secondary delivery line to one side of said secondary circuit pressure regulator and a secondary circuit pressure signal on an opposing side of said secondary circuit pressure regulator, wherein said secondary circuit pressure regulator is biased in a first position so as to not exhaust flow therethrough when said secondary circuit pressure signal is greater than pressure in said secondary feedback line.

4. A fluid pumping system, as defined in claim 3, wherein said secondary circuit pressure regulator is in communication with said discharge line and said secondary delivery line.

5. A fluid pumping system, as defined in claim 4, wherein said secondary circuit pressure regulator includes a second position to exhaust flow from said discharge line to said return line while not exhausting flow from said secondary delivery line.

6. A fluid pumping system, as defined in claim 5, wherein said secondary circuit pressure regulator includes a third position to exhaust flow from said discharge line and said secondary delivery line to said return line to reduce the horsepower draw of said secondary pump.

* * * * *